(12) United States Patent
Salinas-Fox et al.

(10) Patent No.: US 10,865,819 B2
(45) Date of Patent: Dec. 15, 2020

(54) TUNELESS CANTILEVER SYSTEM

(71) Applicant: YAZAKI NORTH AMERICA, INC., Canton, MI (US)

(72) Inventors: Victor Hugo Salinas-Fox, Guadalupe (MX); Junji Yagi, Shimada (JP); Ionut Patrulescu, Drobeta-Turnu Severin (RO); Brian Christopher Schweitzer, Canton, MI (US)

(73) Assignee: Yazaki North America, Inc., Canton, MI (US)

( * ) Notice: Subject to any disclaimer, the term of this patent is extended or adjusted under 35 U.S.C. 154(b) by 563 days.

(21) Appl. No.: 15/160,994

(22) Filed: May 20, 2016

(65) Prior Publication Data

US 2017/0335870 A1 Nov. 23, 2017

(51) Int. Cl.
*F16B 5/06* (2006.01)
*F16B 2/22* (2006.01)

(52) U.S. Cl.
CPC .............. *F16B 2/22* (2013.01); *F16B 5/0664* (2013.01); *Y10T 403/606* (2015.01)

(58) Field of Classification Search
CPC ........ F16B 5/0664; F16B 2/22; F16B 15/004; F16B 5/0642; F16B 5/065; F16B 5/0657; Y10T 403/606
See application file for complete search history.

(56) References Cited

U.S. PATENT DOCUMENTS

| | | | |
|---|---|---|---|
| 3,551,963 A | | 1/1971 | Mosher, Jr. et al. |
| 4,212,415 A | * | 7/1980 | Neely ..................... B65D 11/10 220/324 |
| 4,517,711 A | * | 5/1985 | Tanaka .................. F16B 21/086 24/297 |
| 4,541,036 A | * | 9/1985 | Landries ................ H02B 1/048 220/3.6 |
| 4,866,579 A | * | 9/1989 | Miller ..................... B60J 3/0282 362/492 |
| 5,100,015 A | * | 3/1992 | Vanderstuyf ......... B65D 50/045 220/324 |
| 5,131,711 A | * | 7/1992 | Laferle .................. B60J 3/0278 24/662 |
| 5,348,356 A | * | 9/1994 | Moulton ................. E05B 37/20 292/80 |
| 5,433,498 A | * | 7/1995 | Ishiwata ............. B60R 13/0206 24/625 |
| 5,931,514 A | * | 8/1999 | Chung .................... F16B 12/26 220/326 |
| 6,006,941 A | * | 12/1999 | Hitchings ............ B65D 50/046 220/284 |
| 6,126,458 A | * | 10/2000 | Gregory, II ........ H01R 13/6215 439/364 |

(Continued)

*Primary Examiner* — Matthew R McMahon
(74) *Attorney, Agent, or Firm* — Foley & Lardner LLP

(57) ABSTRACT

A cantilever system comprises a snapping body configured to ensure a persistent contact with a receiving body. The snapping body includes a supporting body extending from the snapping body, a step extending from the supporting body, the step configured to lock the snapping body and the receiving body in an engaged position, and a constant contact protrusion extending into the step, wherein the constant contact protrusion is configured to maintain engagement of the snapping body and the receiving body.

25 Claims, 4 Drawing Sheets

(56) References Cited

U.S. PATENT DOCUMENTS

| | | | | |
|---|---|---|---|---|
| 6,250,708 | B1 * | 6/2001 | Kurachi | B60J 3/0221 296/97.9 |
| 6,318,585 | B1 * | 11/2001 | Asagiri | B60R 22/34 220/326 |
| 6,422,643 | B1 * | 7/2002 | Pease | B60R 19/52 24/297 |
| 6,557,920 | B1 * | 5/2003 | Hobson | B60J 3/0278 296/97.1 |
| 6,669,262 | B1 * | 12/2003 | Crotty, III | B60J 3/0278 296/97.1 |
| 6,698,815 | B1 * | 3/2004 | Mills | B60J 3/0282 296/1.11 |
| 7,562,857 | B2 * | 7/2009 | Nagai | F16B 5/0664 248/222.12 |
| 7,896,409 | B2 * | 3/2011 | Abdelnour | B60R 19/52 180/68.6 |
| 8,511,707 | B2 * | 8/2013 | Amamori | B60R 21/2035 280/728.2 |
| 8,677,573 | B2 * | 3/2014 | Lee | B60R 13/0206 24/289 |
| 8,943,655 | B2 * | 2/2015 | Kabeya | B60R 11/0217 24/453 |
| 9,049,905 | B2 * | 6/2015 | Perez | A44B 17/0047 |
| 9,429,176 | B2 * | 8/2016 | Morris | F16B 2/22 |
| 9,452,715 | B2 * | 9/2016 | De La Mora Ramirez | B60R 11/00 |
| 9,618,026 | B2 * | 4/2017 | Morris | F16B 17/00 |
| 9,650,081 | B2 * | 5/2017 | Lakatos | B60R 13/00 |
| 9,651,072 | B2 * | 5/2017 | Berthold | F16B 21/088 |
| 9,676,297 | B2 * | 6/2017 | Peniche | B60N 2/0725 |
| 9,868,348 | B2 * | 1/2018 | Watari | B60R 19/52 |
| 10,300,833 | B2 * | 5/2019 | Alexander | B60P 7/04 |
| 10,330,020 | B2 * | 6/2019 | Goupil | F01D 25/243 |
| 2002/0017800 | A1 * | 2/2002 | Ichikawa | B60J 3/023 296/97.9 |
| 2006/0230586 | A1 * | 10/2006 | Maki | B60R 13/0206 24/297 |
| 2008/0011930 | A1 * | 1/2008 | Nagai | F16B 5/0664 248/503 |
| 2008/0317549 | A1 * | 12/2008 | Matthews | B60R 19/52 403/376 |
| 2012/0187812 | A1 * | 7/2012 | Gerst | E05C 19/06 312/237 |
| 2015/0375798 | A1 * | 12/2015 | Morris | F16B 5/0628 403/14 |
| 2016/0200265 | A1 * | 7/2016 | Polovich | B60R 13/04 24/292 |

* cited by examiner

TUNELESS CANTILEVER SYSTEM

TECHNICAL FIELD

The present application relates generally to the field of cantilevers. In particular, the embodiments of the present invention relate to a device and method for ensuring a tuneless cantilever system.

BACKGROUND

A cantilever system may sometimes include both snapping and receiving bodies such as planar and right angle snaps and receivers. The snaps and receivers have mating surface clearance dimensions which provide the amount of tolerance area required for the planar snap to clear the snap receiver. The clearance is then iteratively tuned until target clearance dimensions are met to account for various manufacturing tolerances to prevent noises such as rattles or buzzes generated by interfacing surfaces of the planar snap and the snap receiver under varied vehicle conditions. A tool maker then implements the dimensional changes identified during tuning for every snap, makes injection molding trial parts based on those dimensions, and confirms that the target clearance dimensions for each snap and receiver are met. This iterative development cycle adds several weeks to the tool development schedule. Further, when the planar snap mates with the snap receiver, the mating of such bodies ensures that the two bodies remain engaged. However, the inability to achieve target clearance dimensions without tuning as described above results in disengagement of the planar snap and the snap receiver and/or noises such as rattles or buzzes generated by interfacing surfaces of each respective body. Thus, an ongoing need exists for improved designs that allow for tuneless operability of a cantilever system for mating two parts while maintaining high retention forces.

SUMMARY OF THE INVENTION

In an example embodiment, a cantilever system configured for tuneless operability comprises a snapping body that includes a supporting body, a step or recess, and a constant contact protrusion. The cantilever system is configured to ensure a persistent contact with a receiving body. The supporting body extends from the snapping body. The step extends from the supporting body. The step is configured to lock the snapping body and the receiving body in an engaged position. The constant contact protrusion extending into the step, wherein the constant contact protrusion is configured to maintain engagement of the snapping body and the receiving body.

These and other features of the implementations described herein, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Figure 1:
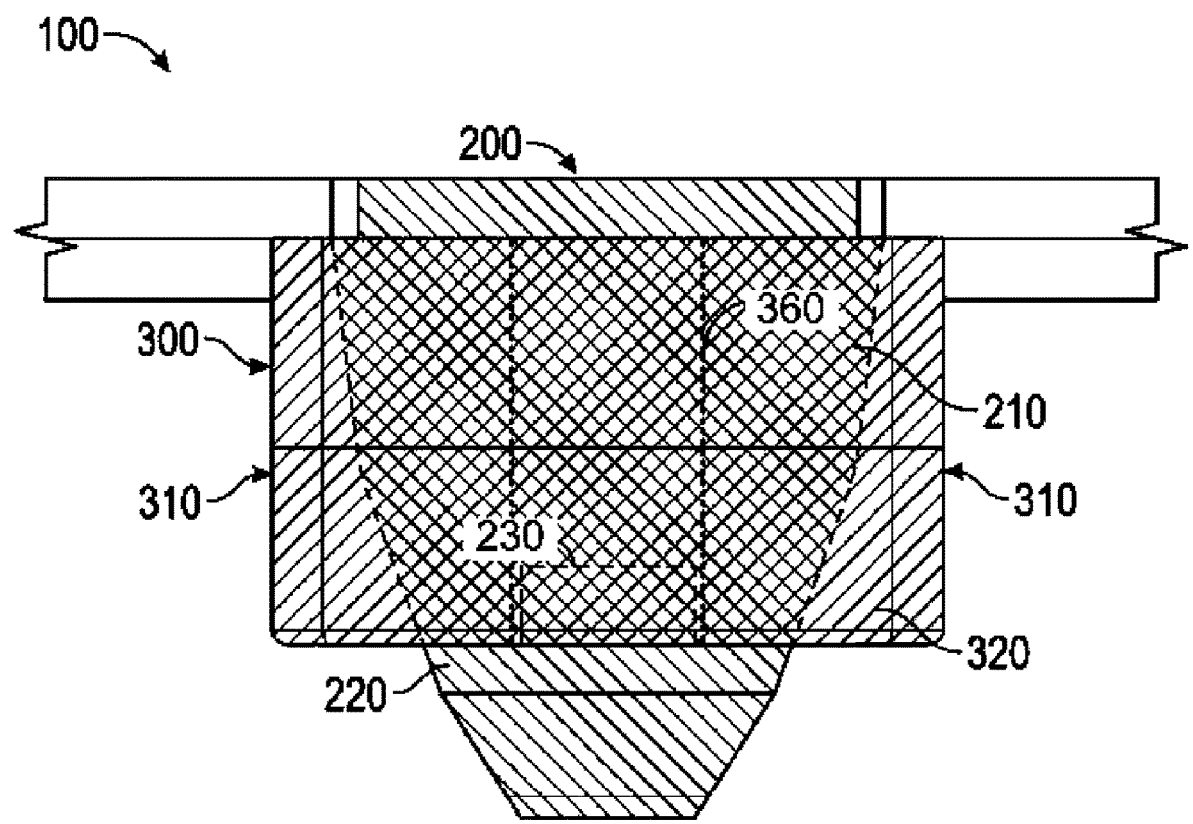
FIG. 1 illustrates an front perspective view of a cantilever system according to an example embodiment.

Referring to the figures generally, an apparatus (e.g., a cantilever system 100) configured for tuneless operability is described. FIG. 1 illustrates a front perspective view of the cantilever system 100 according to an example embodiment. The cantilever system 100 may include a snapping body 200 (e.g., a planar snap or right angle) comprising a supporting body 210, a step 220, and a constant contact protrusion 230. The cantilever system 100 may further include a receiving body 300 (e.g., a snap receiver) comprising first and second side supports 310 and first and second connecting walls 320. The receiving body 300 is configured to mate with the snapping body 200 as described herein. The cantilever system 100 may be used for applications such as, but not limited to, mounting instrument clusters on a vehicle, connector housings, wire harness networks, etc. Hence, the snapping body 200 may be associated with a panel of instruments, a connector, etc., and the receiving body 300 may be associated with a panel upon which the instruments are mounted, a mating connector, etc., or vice versa.

The snapping body 200 and the receiving body 300 may each be made of a material such as a plastic, composite, and/or any other suitable material like, or different from, the material included in the embodiment as depicted or a combination thereof. In the depicted embodiment, the snapping body 200 and the receiving body 300 are each composed of a plastic (e.g., thermoplastic) and/or any other suitable material. As depicted, the snapping body 200 and the receiving body 300 are each formed by an injection molding process.

Figure 2A:
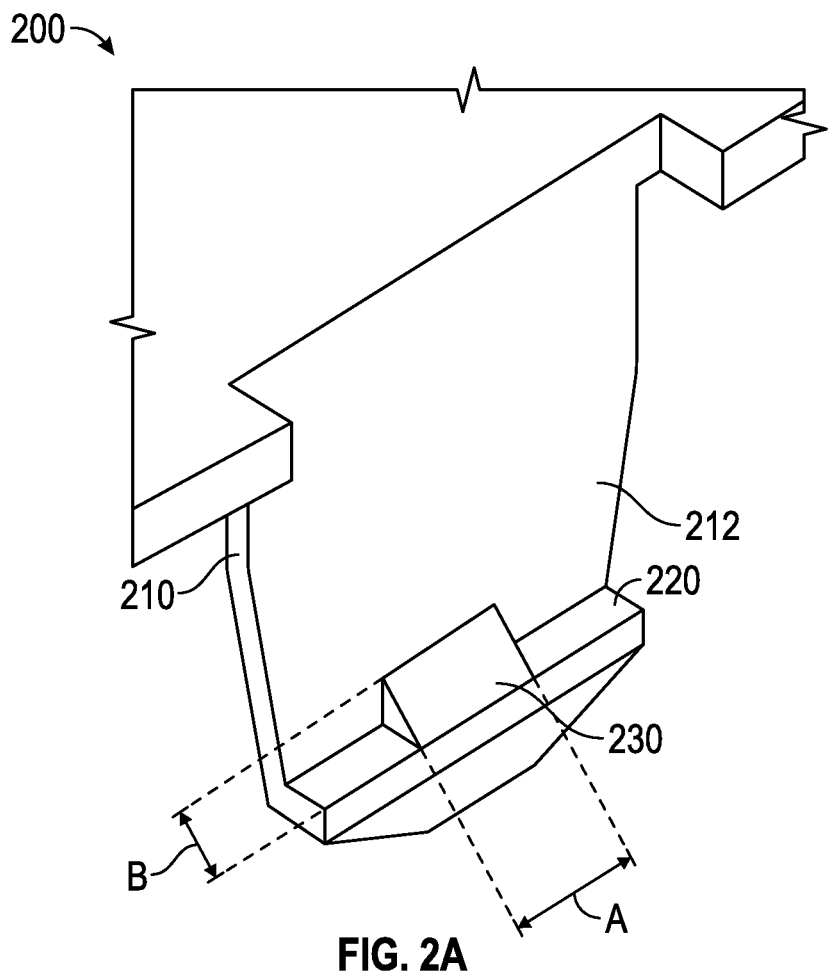
FIG. 2A illustrates a isometric perspective view of a snapping body according to an example embodiment.
Figure 2B:
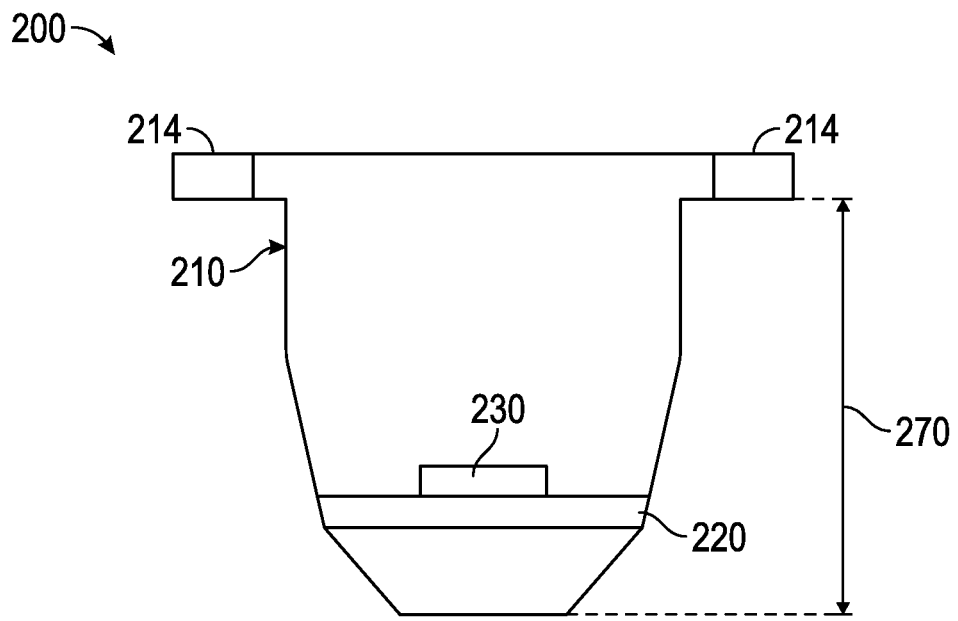
FIG. 2B illustrates a front perspective view of a snapping body according to an example embodiment.

With reference to FIGS. 2A and 2B, front perspective views of the snapping body 200 (e.g., a planar snap) is illustrated according to an example embodiment. The snapping body 200 is configured to ensure a persistent contact with the receiving body 300. The snapping body 200 may include the supporting body 210, supporting arms 214, step 220, and constant contact protrusion 230. As depicted, the snapping body 200 comprises predetermined dimensions configured to mate with the receiving body 300.

As illustrated, the supporting body 210 extends perpendicularly from the supporting arms 214. The step 220 extends from the supporting body 210. The step 220 is configured to lock the snapping body 200 and the receiving body 300 in an engaged position. In further embodiments, the step 220 is configured to hold up the receiving body 300 such that the receiving body 300 may rest on or otherwise receive support from the step 220. The supporting body 210 may be operable to engage the snapping body 200 with the receiving body 300 via a passage 350 defined by the receiving body 300 as described herein with reference to FIGS. 3A-3B. For example, the supporting body 210 may be operable to drive the snapping body 200 into the receiving body 300 via the passage 350. In other embodiments, the receiving body 300 may be operable, via the passage 350, to move along the supporting body 210 in the direction 270. In this regard, the supporting body 210 is configured to mate the snapping body 200 with the receiving body 300.

The snapping body 200 includes a constant contact protrusion 230 configured to secure the mating of the snapping body 200 and the receiving body 300 to otherwise prevent motion, resultant sound (e.g., a rattle, buzz, or other resulting sound caused by the interaction of the respective interfaces associated with each body), disconnection of each respective body, or a combination thereof. The constant contact protrusion 230 extends into the step 220 as depicted. The constant contact protrusion 230 may be injection molded. For example, the constant contact protrusion 230 may be configured, via an injection molding process, to extend into the step 220. In some embodiments, the constant contact protrusion 230 may extend from or otherwise be coupled to the receiving body 300. The constant contact protrusion 230 is configured to snap into the passage 350 as described herein with reference to FIGS. 3A-3B and 4.

In the embodiment as depicted, the constant contact protrusion 230 is configured to take a form comprising a ramp, slope, or other suitable form. Advantageously, the constant contact protrusion 230 ensures interaction (e.g., a line-to-line interaction such as maintaining a persistent contact or otherwise continuous contact between the interior surfaces of the snapping body and the interior walls of the receiving body) over a dimensional range with respect to a locking channel 360 as described herein below. Further, the constant contact protrusion 230 eliminates the need to tune the snapping body 200 and/or the receiving body 300 to meet dimensional variations such as a target clearance (e.g., a clearance of 0.07 mm), thereby, eliminating the iterative development cycle of tuning the cantilever system 100 and reducing development time. To account for the dimensional variations in the snapping body 200 and/or the receiving body 300 (e.g., clearance variations of the planar snap, snap receiver, etc.), an engaging force (e.g., a pushing force) actuates (e.g., drives) the receiving body 300 such that the receiving body 300 moves along the constant contact protrusion 230 (e.g., down the slope or ramp). In turn, the constant contact protrusion 230 snaps into the engaged position with respect to the locking channel 360 (e.g., within the locking channel 360). The slope and/or ramp of the constant contact protrusion 230 provides the advantage of accommodating the dimensional variations of the receiving body 300 relative to, for example, various areas of the passage 350 in the directions X, Y (depicted in FIG. 3A) which eliminates the iterative development cycle of tuning the cantilever system 100 and reduces development time.

The dimensional variations are not limited to those included in the respective illustrations. Such dimensional variations may be increased, decreased, adjusted or otherwise scaled depending on the application of the cantilever system 100. For example, the dimensional variations of the snapping body 200 may include scaling the length and/or the width of the constant contact protrusion 230 in the directions A, B based, at least in part, on the application utilized (e.g., to accommodate various instrument cluster designs ranging in size and scope). The dimensional variations of the receiving body 300 may include scaling the length, width, and/or area of the passage 350 in the directions X, Y based, at least in part, on the application to, for example, clear a snapping body for receipt of that snapping body therethrough. In further examples, the dimensional variations of the receiving body 300 may include scaling the length, width, and/or area of the locking channel 360 in the directions C, D to accommodate dimensional variations in the constant contact protrusion 230.

The constant contact protrusion 230 may ensure the cantilever system 100 is fully mated by securing or otherwise maintaining the contact of the snapping body 200 and the receiving body 300. The snapping body 200 may be configured for operation between a disengaged position (e.g., an unsecured, unlocked, disconnected position, etc.) and an engaged position (e.g., a locked, secured, fully mated position, etc) along the direction 270. To that end, the constant contact protrusion 230 may interact with the locking channel 360 (as described herein with reference to FIGS. 3A-3B and 4) in the direction 270 between the disengaged position and the engaged position. For example, the constant contact protrusion 230 may interact with the locking channel 360 such that the constant contact protrusion 230 snaps into the engaged position, thereby, maintaining engagement of the snapping body 200 and the receiving body 300. Such configuration of the constant contact protrusion 230 in the engaged position prevents (e.g., stop, inhibit, etc.) the snapping body 200 from becoming disengaged with the receiving body 300 which maintains contact of each respective body along the direction 270.

Figure 3A:
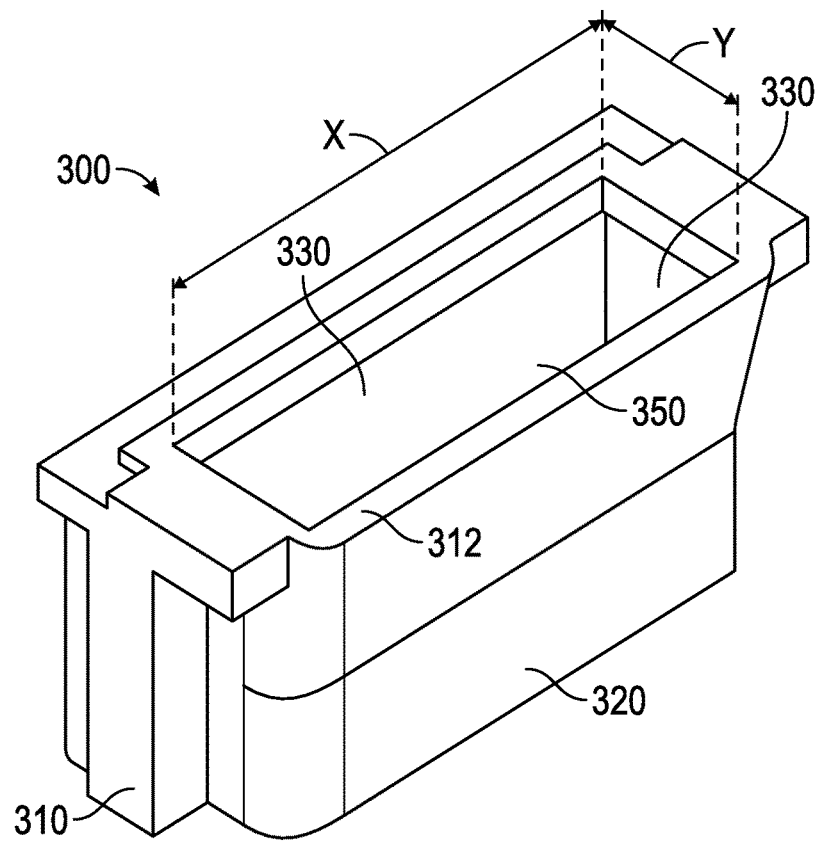
FIG. 3A illustrates a isometric perspective view of a receiving body according to an example embodiment.
Figure 3B:
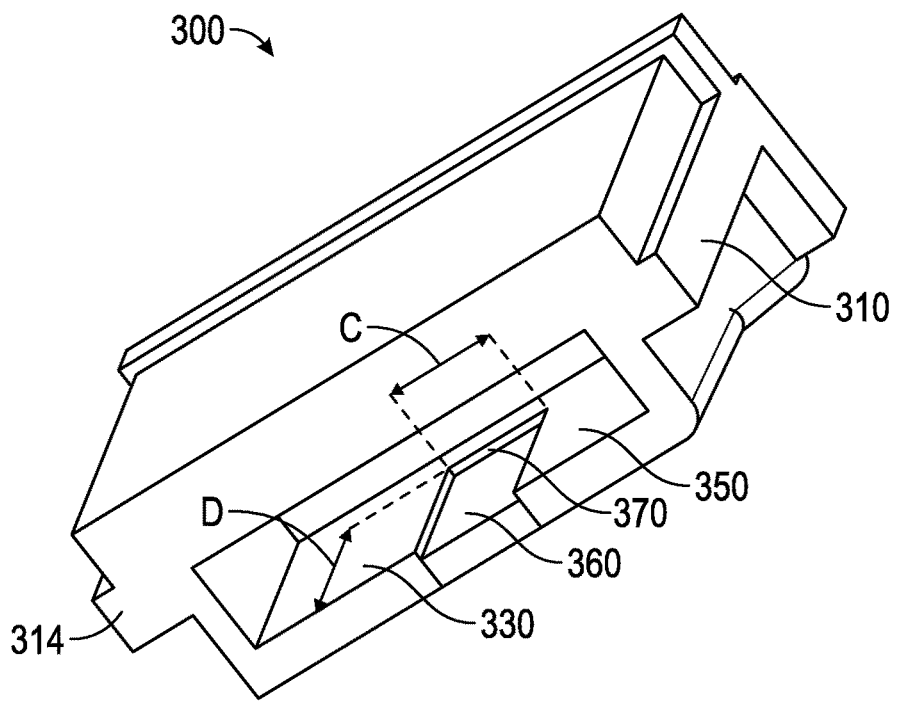
FIG. 3B illustrates an interior perspective view of a receiving body according to an example embodiment.

With reference to FIGS. 3A, and 3B a side perspective view and an interior perspective view of a receiving body 300 (e.g., a snap receiver) is illustrated according to an example embodiment. As depicted, the receiving body 300 includes first and second side supports 310, first and second connecting walls 320, a passage 350, and a locking channel 360. The first and second side supports 310 may be configured to extend perpendicularly from a top surface 312. The receiving body 300 further includes the first and second connecting walls 320. The first and second connecting walls 320 may be disposed between the first and second side supports 310. The receiving body 300 further includes at least one interior wall 330.

The passage 350 may be defined by the first and second side supports 310 and the first and second connecting walls 320. The passage 350 is configured to facilitate the mating of the receiving body 300 with the snapping body 200. In some embodiments, the receiving body 300 may be configured to surround, via the passage 350, at least a portion of the snapping body 200. Accordingly, the passage 350 is configured to receive at least a portion of the snapping body 200 therethrough.

As described above with reference to FIG. 2A, the snapping body 200 may be configured for operation between a disengaged position (e.g., an unsecure position) and an engaged position (e.g., a secure position) along the direction 270. In this regard, the receiving body 300 may be positioned along the supporting body 210 in the direction 270 via the passage 350. The receiving body 300 may rest on or otherwise be supported by the step 220 such that receiving body 300 and the step 220 meet at respective contact edges such that a line-to-line contact between the receiving body 300 and the step 220 absorbs any span between snapping body 200 (e.g., the planar snap) and the receiving body 300 (e.g., the snap receiver).

As illustrated, the receiving body 300 includes the interior wall 330 configured to define a locking channel 360. Alternatively or additionally, the locking channel 360 may be defined by the snapping body 200. The locking channel 360 is configured to interact with or otherwise receive the constant contact protrusion 230 coupled to the snapping body 200. The locking channel 360 is defined by a channel ceiling 370 configured to lock the constant contact protrusion 230 into the locking channel 360 or otherwise prevent the constant contact protrusion 230 from extending beyond the locking channel 360. The receipt of the constant contact protrusion 230 is configured to ensure an interior surface 212 of the snapping body 200 and the interior wall 330 of the receiving body 300 maintain a persistent contact (e.g. a continuous part-to-part contact) maintained over a dimensional range. The constant contact protrusion 230 is configured to snap responsive to the interaction of the constant contact protrusion 230 and the locking channel 360. For example, as the receiving body 300 moves along the snapping body 200 in the direction 270, the locking channel 360 engages with or otherwise makes contact with the constant contact protrusion 230 such that the constant contact protrusion 230 snaps, thereby, securing the mating of the snapping body 200 and the receiving body 300. Securing the mating of the snapping body 200 and the receiving body 300 advantageously prevents motion, resultant sound (e.g., a rattle, buzz, or other resulting sound caused by the interaction of the respective interfaces associated with each body), or disconnection of each respective body.

Figure 4:
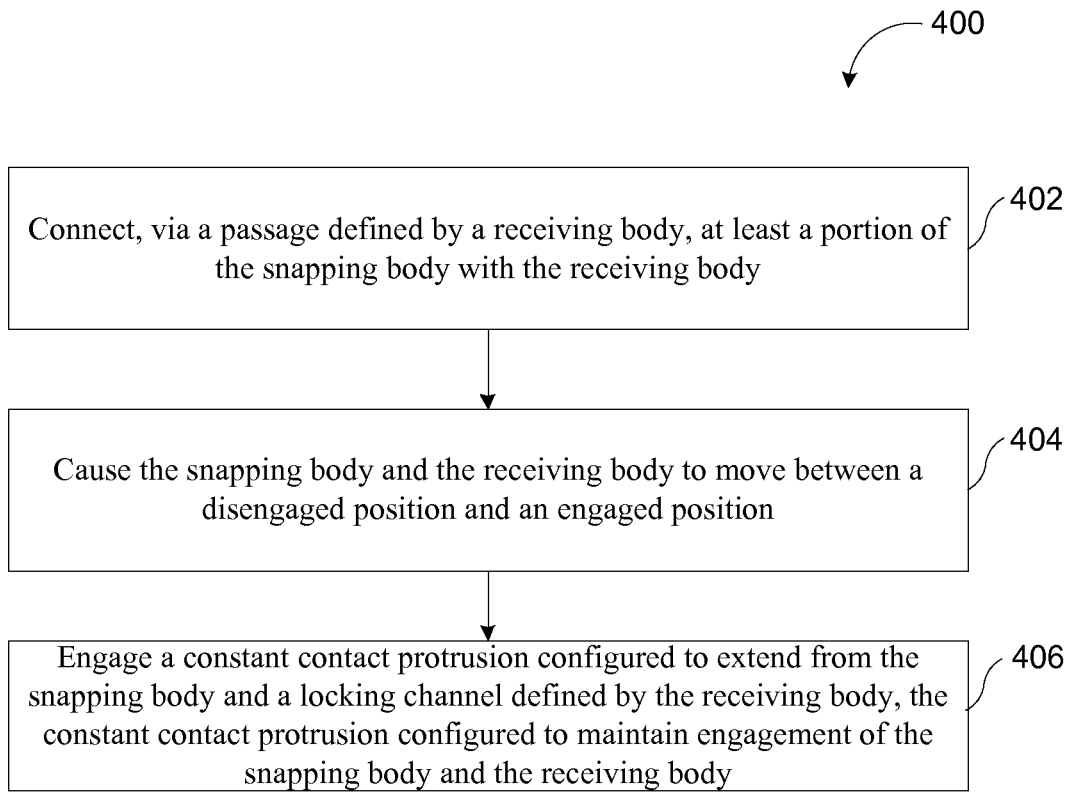
FIG. 4 illustrates a flowchart of a method of configuring a cantilever system for tuneless operability according to one embodiment.

Referring now to FIG. 4, a flowchart of a method of configuring a cantilever system for tuneless operability is shown, according to one embodiment. The processes shown in FIG. 4 are performed as the cantilever system 100 is being installed. At process 402, at least a portion of the snapping body 200 is connected with the receiving body 300 via a passage defined by the receiving body 300. The receiving body 300 may be configured to surround, via the passage 350, at least a portion of the snapping body 200. Accordingly, the passage 350 is configured to receive at least a portion of the snapping body 200 therethrough.

At process 404, the receiving body 300 moves from a disengaged position to an engaged position. In the disengaged position the cantilever system 100 is in an unsecured, unlocked, disconnected position. For example, the receiving body 300 is not secured to the snapping body 200. While in the disengaged position, the snapping body 200 and/or the receiving body 300 are susceptible to noises, such as rattling or buzzing, generated due to the interface or contact of the respective bodies. As the receiving body 300 is moved between the disengaged position and the engaged position, the receiving body 300 moves along the direction 270. For example, the receiving body 300 may move in a downward direction to position the receiving body 300 for engagement with the constant contact protrusion 230 as described herein at process 406. In the engaged position the cantilever system 100 is in a secured, locked, or otherwise fully mated position. For example, the receiving body 300 is fully mated or otherwise secured to the snapping body 200.

At process 406, the snapping body 200 and the receiving body 300 are caused to move between a disengaged position to an engaged position whereby the constant contact protrusion 230 which is configured to extend from the snapping body 200 is engaged with the locking channel 360 defined by the receiving body 300. The constant contact protrusion 230 is configured to interact with (e.g., fit within, slide within, or otherwise securely move within) the locking channel 360. Interaction between the constant contact protrusion 230 and the locking channel 360 facilitates the movement of the snapping body 200 and the receiving body 300 from each respective position. For example, interaction between the constant contact protrusion 230 and the locking channel 360 facilitates the movement of the snapping body 200 and the receiving body 300 from the disengaged position to the engaged position such that the constant contact protrusion 230 maintains engagement of the snapping body and the receiving body. An engaging force (e.g., a pushing force) actuates (e.g., drives) the receiving body 300 along the constant contact protrusion 230 (e.g., down the slope or ramp) such that the constant contact protrusion 230 snaps into the engaged position with respect to the locking channel 360. In the engaged position, the snapping body 200 and the receiving body 300 are fully mated which ensures a persistent contact (e.g., a continuous part-to-part contact) while maintaining retention force (e.g., a retaining force). Alternatively or additionally, interaction between the constant contact protrusion 230 and the locking channel 360 may facilitate the movement of the snapping body 200 and the receiving body 300 from the engaged position to the disengaged position responsive to a disengaging force (e.g., a pulling force) that facilitates the movement of the receiving body 300 from the engaged position to the disengaged position. As depicted, the length of the constant contact protrusion 230 is less than the length of the step 220 to ensure that there is surface-to-surface contact between the step 220 and the bottom surface 314 during disengagement which increases the retention force. During disengagement, for example, the constant contact protrusion 230 moves slidably along the locking channel 360 until the surface of the step 220 and the bottom surface 314 of the receiving body 300 come into contact and the retention force increases.

While this specification contains many specific embodiment details, these should not be construed as limitations on the scope of what may be claimed, but rather as descriptions of features specific to particular embodiments. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

As utilized herein, the terms "coupled," "connected," and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

It is important to note that the construction and arrangement of the system shown in the various exemplary embodiments is illustrative only and not restrictive in character. All changes and modifications that come within the spirit and/or scope of the described embodiments are desired to be protected. It should be understood that some features may not be necessary and embodiments lacking the various features may be contemplated as within the scope of the application, the scope being defined by the claims that follow. When the language "at least a portion" and/or "a portion" is used the item can include a portion and/or the entire item unless specifically stated to the contrary.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A cantilever system configured for tuneless operability, the cantilever system comprising:
    a receiving body; and
    a snapping body configured to ensure a persistent contact with the receiving body, the snapping body comprising:
        a supporting body having a height and a length;
        a step extending from the supporting body, the step configured to lock the snapping body and the receiving body in an engaged position; and
        a constant contact protrusion extending into the step, the constant contact protrusion including:
            a first edge extending along a portion of the length of the supporting body;
            a second edge extending along a portion of a length of the step; and
            a planar contact surface configured to engage at least a portion of the receiving body, the contact surface extending between the first edge and the second edge;
            wherein a length of the constant contact protrusion is less than the length of the step; and
        wherein the constant contact protrusion is configured to maintain engagement of the snapping body and the receiving body;
        wherein, in the engaged position, the constant contact protrusion is configured to snap into a locking channel defined in an interior wall of the receiving body.

2. The system of claim 1, wherein the receiving body comprises:
    first and second side supports;
    first and second connecting walls disposed between the first and second side supports;
    and a passage defined by the first and second side supports and the first and second connecting walls.

3. The system of claim 2, wherein the passage is configured to receive at least a portion of the snapping body therethrough.

4. The system of claim 2, wherein the receiving body is configured to move along the constant contact protrusion, and wherein the constant contact protrusion snaps into the engaged position.

5. The system of claim 2, wherein the locking channel is configured to receive the constant contact protrusion of the snapping body.

6. The system of claim 5, wherein the receipt of the constant contact protrusion is configured to ensure an interior surface of the snapping body and the interior wall of the receiving body maintain the persistent contact over a dimensional range.

7. The system of claim 1, wherein the receiving body comprises predetermined dimensions configured to receive the constant contact protrusion.

8. The system of claim 1, wherein the snapping body is formed by injection molding.

9. The system of claim 1, wherein the constant contact protrusion is configured to at least one of prevent motion, resultant sound, or disconnection of the snapping body and the receiving body.

10. The system of claim 1, wherein the constant contact protrusion is configured to take a form comprising a ramp.

11. The system of claim 1, wherein the constant contact protrusion is configured to accommodate dimensional variations corresponding to the receiving body.

12. The system of claim 11, wherein the dimensional variations corresponding to at least one of the snapping body or the receiving body may be increased, decreased, scaled, or a combination thereof.

13. The system of claim 1, wherein the length of the constant contact protrusion is configured to increase a retention force.

14. The system of claim 1, wherein the length of the constant contact protrusion is configured to ensure a surface-to-surface contact between the step and a bottom surface of the receiving body.

15. The system of claim 14, wherein the snapping body and the receiving body are configured to move from the engaged position to a disengaged position responsive to a disengaging force.

16. A cantilever system configured for tuneless operability, the cantilever system comprising:
    a receiving body comprising:
        first and second side supports;
        first and second connecting walls disposed between the first and second side supports;
        a passage defined by the first and second side supports and the first and second connecting walls; and
        an interior wall configured to define a locking channel; and
    a snapping body configured to ensure a persistent contact with the receiving body, the snapping body comprising:
        a supporting body;
        a step extending from the supporting body at a height along the supporting body, the step having a length extending between a first location along a length of the supporting body and a second location along the length of the supporting body, wherein the step is configured to lock the snapping body and the receiving body in an engaged position; and
        a constant contact protrusion extending into the step, the constant contact protrusion including:
            a first edge having a length extending along the length of the supporting body;
            a second edge having a length extending along the step between a first location along the length of the step and a second location along the length of the step; and
            a contact surface configured to engage at least a portion of the receiving body, the contact surface including a planar surface defined between the first edge and the second edge;
        wherein a length of the constant contact protrusion is less than the length of the step; and
        wherein the constant contact protrusion is configured to maintain engagement of the snapping body and the receiving body;

wherein, in the engaged position, the constant contact protrusion is configured to snap into the locking channel in the interior wall of the receiving body.

17. The system of claim 16, wherein the constant contact protrusion is configured to ensure an interior surface of the snapping body and the interior wall of the receiving body maintain the persistent contact over a dimensional range.

18. The system of claim 16, wherein the constant contact protrusion is configured to at least one of prevent motion, resultant sound, or disconnection of the snapping body and the receiving body.

19. The system of claim 16, wherein the length of the constant contact protrusion is configured to increase a retention force.

20. The system of claim 16, wherein the length of the constant contact protrusion is configured to ensure a surface-to-surface contact between the step and a bottom surface of the receiving body.

21. The system of claim 20, wherein the snapping body and the receiving body are configured to move from the engaged position to a disengaged position responsive to a disengaging force.

22. A cantilever system comprising:
a receiving body comprising:
an inner surface defining a passage; and
a channel extending into and defined by at least a portion of the inner surface; and
a snapping body comprising:
a supporting body configured to be received within the passage of the receiving body;
a step attached to and extending from the supporting body; and
a contact protrusion comprising:
a first edge extending along a portion of a length of the supporting body;
a second edge extending along a portion of a length of the step; and
a flat contact surface extending between the first edge and the second edge;
wherein a length of the contact protrusion is less than the length of the step;
wherein a length of the channel is less than the length of the step.

23. The cantilever system of claim 22, wherein the length of the contact protrusion is less than the length of the channel.

24. The cantilever system of claim 23, wherein the contact protrusion is configured to engage the channel when the supporting body is received within the passage of the receiving body.

25. The cantilever system of claim 22, wherein the receiving body is defined between a first edge and second edge, the channel extending between a first surface defined by the first edge of the receiving body and a second surface defined by a portion of the inner surface of the receiving body defined between the first edge and the second edge of the receiving body.

* * * * *